United States Patent
Cha et al.

(10) Patent No.: US 10,945,184 B2
(45) Date of Patent: Mar. 9, 2021

(54) METHOD AND APPARATUS FOR SUPPORTING HANDOVER IN WIRELESS COMMUNICATION SYSTEM

(71) Applicant: SAMSUNG ELECTRONICS CO., LTD., Suwon-si (KR)

(72) Inventors: Hwajin Cha, Seongnam-si (KR); Suengjae Bae, Hwaseong-si (KR); Bumgon Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 16/094,651

(22) PCT Filed: Apr. 18, 2017

(86) PCT No.: PCT/KR2017/004152
§ 371 (c)(1),
(2) Date: Oct. 18, 2018

(87) PCT Pub. No.: WO2017/188646
PCT Pub. Date: Nov. 2, 2017

(65) Prior Publication Data
US 2019/0110237 A1      Apr. 11, 2019

(30) Foreign Application Priority Data

Apr. 26, 2016   (KR) .................. 10-2016-0050694

(51) Int. Cl.
*H04W 36/30*      (2009.01)
*H04W 36/08*      (2009.01)
(Continued)

(52) U.S. Cl.
CPC ..... *H04W 36/305* (2018.08); *H04W 36/0083* (2013.01); *H04W 36/08* (2013.01); *H04W 36/00837* (2018.08); *H04W 88/08* (2013.01)

(58) Field of Classification Search
None
See application file for complete search history.

(56) References Cited

U.S. PATENT DOCUMENTS

2007/0293224 A1   12/2007   Wang et al.
2009/0323638 A1*  12/2009   Catovic ........... H04W 36/00837
                                                         370/331
(Continued)

FOREIGN PATENT DOCUMENTS

KR   10-2011-0120822 A   11/2011
KR   10-2014-0005386 A    1/2014
(Continued)

OTHER PUBLICATIONS

Communication dated Jul. 21, 2017 by the International Searching Authority in counterpart International Patent Application No. PCT/KR2017/004152. (PCT/ISA/210).
(Continued)

*Primary Examiner* — Andrew C Oh
(74) *Attorney, Agent, or Firm* — Sughrue Mion, PLLC

(57) ABSTRACT

The present invention relates to a method and an apparatus for supporting handover and, more particularly, to a method and an apparatus for adjusting handover related parameters. In order to achieve the above-described objective, a method for supporting handover by a base station in a wireless communication system, according to one embodiment of the present invention, comprises the steps of: transmitting a handover parameter to a terminal, based on a handover purpose; receiving, from the terminal, a handover measurement report based on the handover parameter; storing information for the handover purpose; and transmitting, to a target base station, a handover request message including the information for the handover purpose.

15 Claims, 12 Drawing Sheets

(51) Int. Cl.
*H04W 36/00* (2009.01)
*H04W 88/08* (2009.01)

(56) References Cited

U.S. PATENT DOCUMENTS

| | | | |
|---|---|---|---|
| 2010/0124173 A1 | 5/2010 | Agashe et al. | |
| 2010/0124918 A1* | 5/2010 | Agashe | H04W 36/00837 455/423 |
| 2010/0273487 A1* | 10/2010 | Alonso-Rubio | H04W 36/385 455/436 |
| 2011/0317660 A1* | 12/2011 | Jin | H04W 36/0066 370/331 |
| 2012/0093125 A1* | 4/2012 | Hapsari | H04W 36/0016 370/331 |
| 2012/0140653 A1* | 6/2012 | Fang | H04W 24/10 370/252 |
| 2012/0177005 A1* | 7/2012 | Liang | H04W 8/082 370/331 |
| 2012/0258767 A1* | 10/2012 | Liang | H04W 76/00 455/525 |
| 2012/0327810 A1* | 12/2012 | Wang | H04W 36/0085 370/254 |
| 2013/0078993 A1* | 3/2013 | Okino | H04W 36/00837 455/424 |
| 2013/0084871 A1* | 4/2013 | Kitaji | H04W 36/0083 455/436 |
| 2013/0084874 A1* | 4/2013 | Fujishiro | H04W 36/0083 455/440 |
| 2013/0100931 A1 | 4/2013 | Kim | |
| 2013/0316709 A1* | 11/2013 | Watanabe | H04W 60/00 455/435.2 |
| 2014/0038608 A1* | 2/2014 | Won | H04W 36/32 455/436 |
| 2014/0038612 A1* | 2/2014 | Wang | H04W 36/0083 455/436 |
| 2014/0321430 A1* | 10/2014 | Bakker | H04W 36/0072 370/331 |
| 2014/0362717 A1* | 12/2014 | Koskinen | H04W 24/02 370/252 |
| 2015/0031379 A1* | 1/2015 | Zhi | H04W 72/04 455/450 |
| 2015/0036658 A1* | 2/2015 | Mochizuki | H04W 16/14 370/331 |
| 2015/0045014 A1* | 2/2015 | Bodog | H04W 24/10 455/422.1 |
| 2015/0079994 A1 | 3/2015 | Ji et al. | |
| 2015/0092746 A1* | 4/2015 | Jang | H04W 36/0058 370/331 |
| 2015/0141021 A1* | 5/2015 | Kapoulas | H04W 36/30 455/441 |
| 2015/0146690 A1* | 5/2015 | Liang | H04W 36/12 370/331 |
| 2015/0172982 A1 | 6/2015 | Park et al. | |
| 2015/0208308 A1* | 7/2015 | Watanabe | H04W 28/04 455/436 |
| 2015/0223117 A1* | 8/2015 | Jha | H04W 36/0016 455/436 |
| 2015/0223129 A1* | 8/2015 | Liang | H04W 36/14 370/331 |
| 2015/0271717 A1* | 9/2015 | Moon | H04W 76/18 455/437 |
| 2015/0289169 A1* | 10/2015 | Capdevielle | H04W 24/02 455/436 |
| 2015/0327097 A1* | 11/2015 | Chai | H04W 24/08 370/252 |
| 2015/0358477 A1* | 12/2015 | Jeong | H04M 15/57 370/259 |
| 2015/0373772 A1 | 12/2015 | Watanabe et al. | |
| 2016/0021649 A1* | 1/2016 | Zisimopoulos | H04W 64/003 370/329 |
| 2016/0021697 A1* | 1/2016 | Vargantwar | H04W 76/19 370/329 |
| 2016/0095034 A1* | 3/2016 | Hampel | H04W 36/14 370/331 |
| 2016/0302117 A1* | 10/2016 | Inoue | H04W 36/0088 |
| 2016/0345231 A1* | 11/2016 | Moon | H04B 17/318 |
| 2017/0070896 A1* | 3/2017 | Shindo | H04W 36/18 |
| 2017/0188273 A1* | 6/2017 | Yiu | H04W 24/10 |
| 2017/0273069 A1* | 9/2017 | Tenny | H04W 52/242 |
| 2017/0318503 A1* | 11/2017 | Chiba | H04W 24/02 |
| 2017/0374705 A1* | 12/2017 | Mitsui | H04W 72/0413 |
| 2018/0206156 A1* | 7/2018 | Lee | H04W 36/0027 |
| 2019/0058523 A1* | 2/2019 | Wu | H04B 7/0617 |
| 2019/0081767 A1* | 3/2019 | Luo | H04B 1/525 |
| 2019/0112049 A1* | 4/2019 | Phan | B64D 5/00 |
| 2019/0300185 A1* | 10/2019 | Tang | G08G 5/00 |
| 2020/0096594 A1* | 3/2020 | Virtej | G08G 5/0013 |
| 2020/0136774 A1* | 4/2020 | Tang | H04W 76/27 |
| 2020/0137775 A1* | 4/2020 | Tang | H04L 5/0082 |

FOREIGN PATENT DOCUMENTS

| | | |
|---|---|---|
| KR | 10-1432770 B1 | 8/2014 |
| KR | 10-2015-0106422 A | 9/2015 |
| KR | 10-1550464 B1 | 9/2015 |

OTHER PUBLICATIONS

Communication dated Jul. 21, 2017 by the International Searching Authority in counterpart International Patent Application No. PCT/KR2017/004152. (PCT/ISA/237).

* cited by examiner

FIG. 4A

| IE/Group Name | Presence |
|---|---|
| Message Type | M |
| Handover Report Type | M |
| Handover Cause | M |
| Source cell ECGI | M |
| Failure cell ECGI | M |
| Re-establishment cell ECGI | C-ifHandoverReportType HoToWrongCell |
| Target cell in UTRAN | C-ifHandoverReportType InterRATpingpong |
| Source cell C-RNTI | O |
| Mobility Information | O |
| UE RLF Report Container | O |
| UE RLF Report Container for extended bands | O |
| HO purpose & the related Information (New IE) | O |

FIG. 4B

| IE/Group Name | Presence |
|---|---|
| HO Type | M |
| HO Report Type | M |
| HO Source ID | M |
| HO Target ID | M |
| Candidate Cell List | |
| >Candidate Cell ID | M |
| Candidate PCI List | |
| >Candidate PCIs | |
| >>Candidate PCI | M |
| HO purpose & the related Information (New IE) | O |

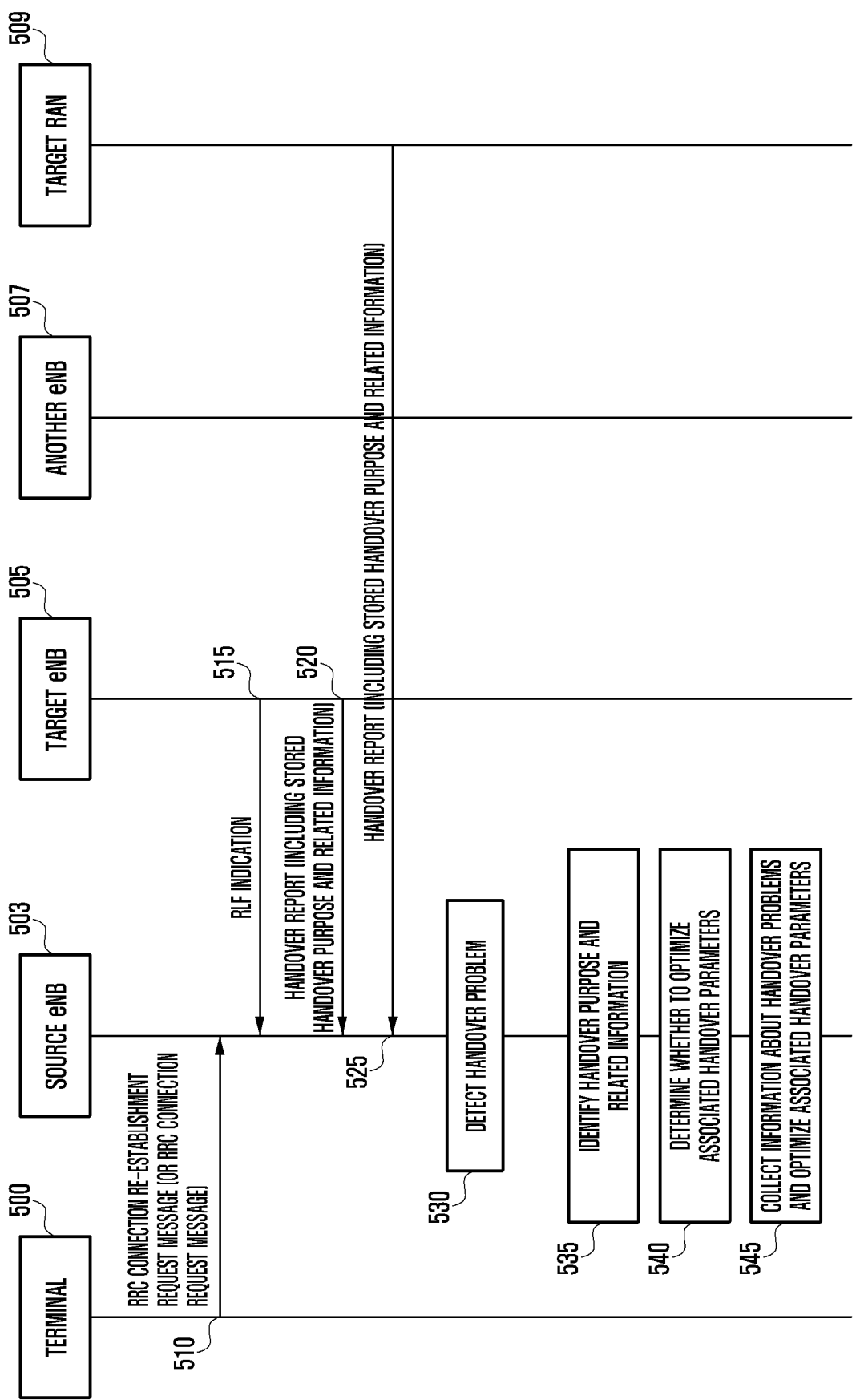

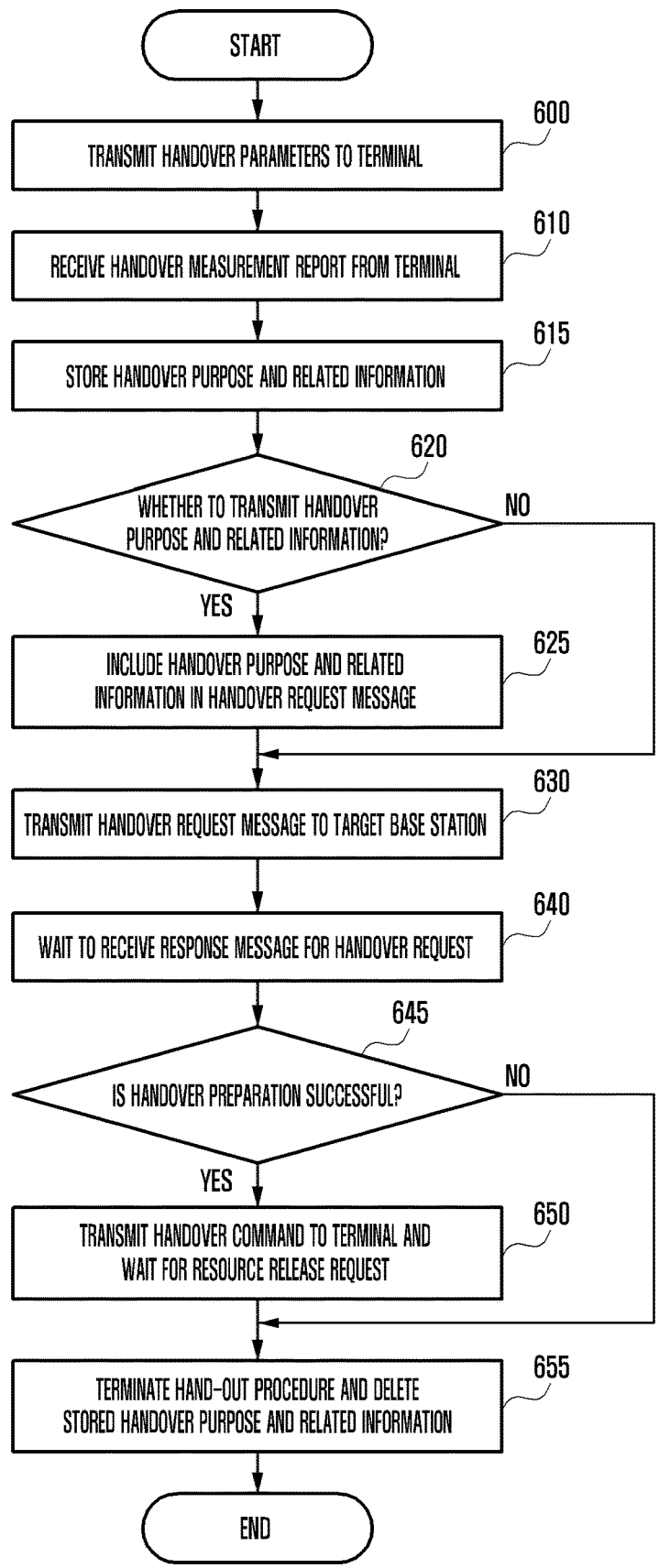

METHOD AND APPARATUS FOR SUPPORTING HANDOVER IN WIRELESS COMMUNICATION SYSTEM

TECHNICAL FIELD

The present invention relates to a method and apparatus for supporting handover and, more particularly, to a method and apparatus for adjusting handover related parameters.

BACKGROUND ART

In mobile communication systems, second and third generation systems are commonly used, and standardization of Long Term Evolution (LTE) systems as fourth generation systems is underway in recent years.

Generally, the threshold for determining a handover event occurrence in the LTE system may have different values depending on the types and purposes of handover. In a situation where various handover thresholds are used depending on the handover purposes, when the source base station detects a handover problem, it must identify the purpose of the handover having caused the handover problem in order to optimize the handover threshold corresponding to the handover purpose.

In particular, when the source base station detects a handover problem by receiving a handover report from the target base station having caused the handover problem, as the handover report is received after the corresponding handover procedure is completed, the source base station cannot know the handover purpose or the handover threshold to be optimized.

Hence, it is necessary to improve the handover procedure in the LTE system where different handover parameters are set according to the various handover purposes so that the handover parameters can be optimized according to the handover purpose in the event of a handover problem.

DISCLOSURE OF INVENTION

Technical Problem

The present invention has been made in view of the above problems.

Accordingly, an aspect of the present invention is to provide a method and apparatus wherein, when the handover procedure is performed, the base station transmits the handover purpose and related information to the target base station and the target base station transmits a handover report including information for a handover purpose when reporting a handover problem.

Solution to Problem

In accordance with an aspect of the present invention, there is provided a method by a base station for supporting handover in a wireless communication system. The method may include: transmitting a handover parameter to a terminal based on a handover purpose; receiving a handover measurement report based on the handover parameter from the terminal; storing information for the handover purpose; and transmitting a handover request message including the information for the handover purpose to a target base station.

In accordance with another aspect of the present invention, there is provided a method by a base station for supporting handover in a wireless communication system. The method may include: receiving a handover request message for a terminal from a source base station; and storing, if information for a handover purpose is included in the handover request message, the information for the handover purpose, wherein the information for the handover purpose may be used by the source base station to configure a handover parameter for the terminal.

In accordance with another aspect of the present invention, there is provided a base station for supporting handover in a wireless communication system. The base station may include: a transceiver configured to transmit and receive signals; and a controller configured to control the transceiver to transmit a handover parameter to a terminal based on a handover purpose, control the transceiver to receive a handover measurement report based on the handover parameter from the terminal, store information for the handover purpose, and control the transceiver to transmit a handover request message including the information for the handover purpose to a target base station.

In accordance with another aspect of the present invention, there is provided a base station for supporting handover in a wireless communication system. The base station may include: a transceiver configured to transmit and receive signals; and a controller configured to control the transceiver to receive a handover request message for a terminal from a source base station, and store, if information for a handover purpose is included in the handover request message, the information for the handover purpose, wherein the information for the handover purpose is used by the source base station to configure a handover parameter for the terminal.

Advantageous Effects of Invention

In a feature of the present invention, when detecting a handover problem, the source base station can identify the handover purpose having caused the handover problem and optimize the handover parameter corresponding to the handover purpose, thereby improving the handover processing quality.

BRIEF DESCRIPTION OF DRAWINGS

FIGS. 4A and 4B illustrate information elements of a handover report transmitted by the target base station to the source base station according to an embodiment of the present invention.

FIG. 5 depicts a procedure where, upon detecting a handover problem, the source base station optimizes the handover parameters based on the handover purpose according to an embodiment of the present invention.

FIG. 6 is a flowchart illustrating a procedure where the source base station transmits a handover request message to the target base station according to an embodiment of the present invention.

MODE FOR THE INVENTION

Figure 1A:
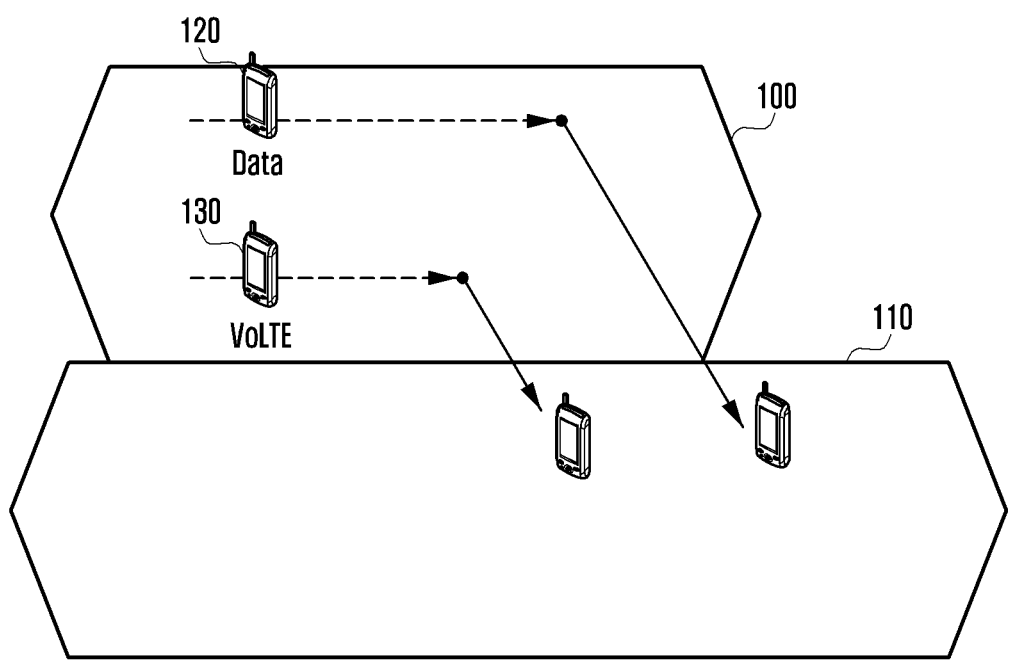
FIGS. 1A and 1B depict a case where a problem arises during inter-base station handover for different types of calls.

Hereinafter, embodiments of the present invention are described in detail with reference to the accompanying drawings. The same or similar reference symbols are used throughout the drawings to refer to the same or like parts. Detailed descriptions of well-known functions and structures incorporated herein may be omitted.

In the following description of the embodiments, the functions and structures well known in the art and not directly related to the present invention may be not described for clarity and conciseness without obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of certain embodiments of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

In the description, examples of the base station may include an evolved node B (eNB), a node B (NB), a radio network subsystem (RNS) including a base station, a base transceiver station (BTS), a base station subsystem (BSS) including a base station, a wireless access point, a radio network controller (RNC), and a base station controller (BSC).

In the LTE system, the following techniques are used to monitor handover related problems and adjust the handover parameters for optimization according to the problems that have occurred.

First, a description is given of a case of performing handover within the LTE network (E-UTRAN).

When a connected terminal experiences a radio link failure (RLF) and tries to reconnect, the base station receiving the reconnection request from the terminal identifies the previous source cell information reported by the terminal and transmits an RLF indication to the previous source cell to notify an RLF occurrence. If the base station receiving the reconnection request of the terminal is the target base station of the previous handover, it transmits a handover report including an inappropriate handover indication to the source base station of the previous handover. Upon receiving an RLF indication or a handover report from the neighbor base station, the source base station adjusts the corresponding handover threshold for determining initiation of handover to the target base station so as to prevent inappropriate handover thereafter.

Next, a description is given of a case of performing handover from the LTE network (E-UTRAN) to a heterogeneous network (UTRAN or GERAN). The source base station (E-UTRAN) transmits to the target base station (UTRAN/GERAN) a reference threshold (T_unnecessary) for determining inappropriate handover. After handover completion, the target base station (UTRAN/GERAN) instructs the hand-in terminal to measure the LTE signal and collects LTE signal measurements from the terminal. Based on the collected LTE signal measurements, the target base station determines whether the handover is an inappropriate handover according to the reference threshold.

If the target base station determines that the handover is inappropriate, it transmits a corresponding handover report to the source base station (E-UTRAN). Upon receiving a handover report indicating inappropriate handover from a heterogeneous network (UTRAN/GERAN) base station, the source base station (E-UTRAN) adjusts the corresponding handover threshold for determining initiation of handover to the UTRAN/GERAN target base station so as to prevent inappropriate handover thereafter.

In the LTE system, it is possible to use handover thresholds for handover initiation according to the handover types and purposes.

In general, to allow a subscriber to receive a service without interruption, the serviceable limit point in the serving cell is managed as the handover threshold. Such a handover scheme is referred to as a coverage-based handover.

Unlike the coverage-based handover, a handover scheme that forcibly transfers a subscriber to a neighboring area at a specific time is referred to as a forced handover. For example, a load-based handover may forcibly transfer connected subscribers to a neighboring area in a low load state when the load of the serving cell approaches or exceeds the limit level for load distribution. As another example, the forced handover may be used to forcibly transfer a subscriber to an adjacent frequency area when a specific cell is scheduled to be shut down for a certain period of time according to operational purposes. In these cases, the handover thresholds are set to different values.

In addition, the handover thresholds may be set to different values according to the types of services used by the subscriber.

Figure 1B:
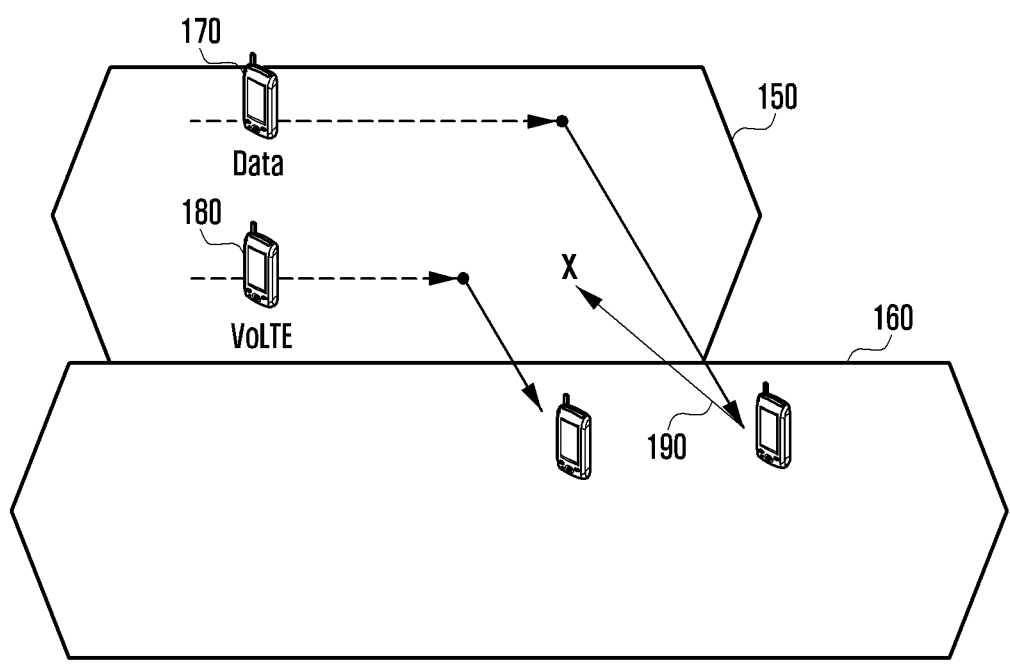

FIGS. 1A and 1B depict a case where a problem arises during inter-base station handover for different types of calls.

More specifically, FIG. 1A depicts a case where the source base station detects a handover problem before the terminal 130 receiving a data service and the terminal 130 receiving a VoLTE service are completely handed over from the source base station area 100 to the target base station area 110.

For the terminal 120 receiving a data service, a handover threshold A may be assigned for the coverage-based handover purpose. For the terminal 130 receiving a voice (VoLTE) service, which is more sensitive to a radio environment change and has a higher KPI requirement level than the data service, a value larger than the handover threshold A for the data service can be assigned as the handover threshold B for the VoLTE service so that handover can be performed in a more stable situation.

In this case, the handover initiation conditions differ according to the services. Hence, when the source base station detects a handover problem, the parameter to be adjusted should be identified according to the handover purpose and type that caused the handover problem.

FIG. 1B depicts a case where the source base station detects a handover problem after the terminal 170 receiving a data service and the terminal 180 receiving a VoLTE service are completely handed over from the source base station area 150 to the target base station area 160.

As in the case of FIG. 1A, a handover threshold A for the data service may be assigned to the terminal 170 receiving a data service, and a handover threshold B for the VoLTE service may be assigned to the terminal 180 receiving a VoLTE service where the handover threshold B is larger than the handover threshold A. In this case, when the handover is completed, the source base station may release all information related to the terminals. Thereafter, the terminal 170 receiving a data service may experience a RLF and transmit a RLF indication to the source base station 190, or the source base station may transmit an RLF indication to the target base station and the target base station may transmit a handover report to the source base station. Thereby, the source base station may recognize that there is a handover problem.

In this case, the source base station detects a handover problem after releasing all information related to the terminals that have already handed over. Hence, the source base station needs the handover purpose and related information to identify the parameter to be adjusted according to the handover purpose and type that caused the handover problem.

Figure 2:
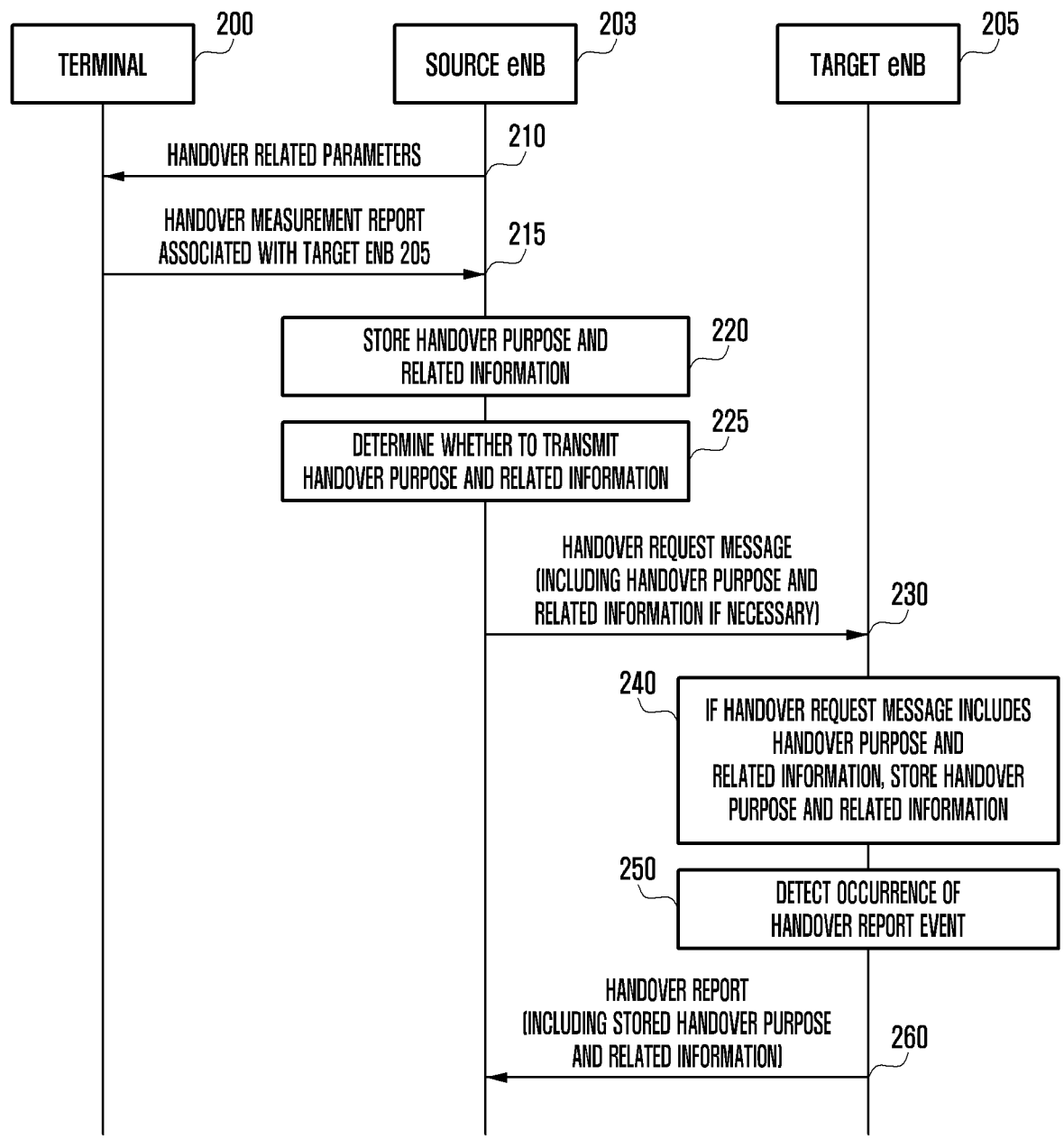
FIG. 2 depicts a procedure where, when the source base station and the target base station are both an eNB (evolved-Node B), the source base station stores and transmits handover purpose and related information for optimization of handover parameters and receives a handover report according to an embodiment of the present invention.

FIG. 2 depicts a procedure where, when the source base station and the target base station are both an eNB (evolved node B), the source base station stores and transmits handover purpose and related information for optimization of handover parameters and receives a handover report according to an embodiment of the present invention.

The source eNB 203 can set in advance handover (HO) events acting as handover initiation conditions according to the handover purposes. Examples of the handover purpose may include a coverage-based HO, load-based HO, service-based HO, and subscription-based HO. Examples of the handover event may include events A1, A2, A3, A4 and A5 for intra-LTE HO and events B1 and B2 for inter-RAT HO. Table 1 below shows examples of the handover event according to the preset handover purposes.

TABLE 1

| Handover purpose | Description | Handover event |
|---|---|---|
| Coverage-based handover | As a typical handover, when the terminal moves to the serving cell boundary, handover is required for maintaining the service | Intra-LTE: A3/A4/A5<br>Inter-LAT: B1/B2 |
| Load-based handover | When the load increases in the serving cell, the terminal is forcibly transferred to the neighboring area to resolve the load condition | Intra-LTE: A3/A4/A5 or periodic<br>Inter-LAT: B1/B2 or periodic |
| Service-based handover | When it is desirable to apply a separate handover parameter to a terminal using a specific service sensitive to the radio environment (e.g., VoLTE) to guarantee the service quality | Intra-LTE: A3/A4/A5<br>Inter-LAT: B1/B2 |
| Subscription-based | When it is desirable to rapidly | Intra-LTE: A3/A4/A5 |

TABLE 1-continued

| Handover purpose | Description | Handover event |
| --- | --- | --- |
| handover | transfer the terminal to a specific area by applying a separate handover parameter according to the subscription information | Inter-LAT: B1/B2 |
| Blind handover | When handover is performed to a preset handover target without measurement of the terminal on the handover target | A1/A2 |
| RLF triggered handover | To maintain connectivity by immediately performing handover when a terminal having experienced an RLF is connected to the neighboring area | RLF triggered HO success RLF triggered HO failure |

The source eNB 203 may transmit handover related parameters to the terminal 200 (210). The source eNB 203 includes handover related parameters (e.g., handover event, handover threshold, and time to trigger (TTT)) for determining the occurrence time of a handover event according to the handover purpose. The source eNB 203 may transmit the terminal 200 the related parameters to be set according to the handover purpose.

When the terminal 200 satisfies the handover initiation condition based on the received handover related parameters, it may transmit the source eNB 203 a handover measurement report about the target eNB 205 (215).

Thereafter, the source eNB 203 may store the handover purpose and related information (220). The source eNB 203 may store and manage the handover purpose and related information as the UE context of the terminal. The handover purpose and related information may include all or some of the following information. The handover purpose and related information may include at least the HO purpose, the HO event type, and the service type for the terminal.

The handover purpose and related information may include information on the handover purpose and handover initiation condition. The handover purpose and related information may include at least one of information on the handover purpose set for the terminal, information on the type of the corresponding handover event, information on the handover event parameter for determining the occurrence time of the handover event, and information on the measured quality level at the initiation of the handover event. Here, the measured quality level is information included in the measurement report transmitted by the terminal, and refers to the reception quality information of the handover target cell at the time of occurrence of the handover event.

The handover purpose and related information may include at least one of information on the type of the service being used by the terminal, terminal/call type identification information, and terminal identification information. The information on the type of the service being used by the terminal indicates information on the representative service (or, service group) that is used by the terminal at the handover initiation. For example, the service type can be used to distinguish a VoLTE terminal from a data terminal. The terminal/call type identifier is an identifier for identifying a specific type of terminal/call, and can be used when a separate handover is applied to a specific terminal/call type. For example, the terminal/call type identifier can be used to identify the terminal type (smart phone, tablet, wearable device), the call type (emergency, high priority access), or the subscription type (enterprise network subscriber, disaster/public network subscriber).

The terminal identifier of a specific terminal is an identifier for identifying the terminal and may be one of various terminal identifiers used by the base station (e.g., S-TMSI (SAE (system architecture evolution) temporary mobile subscriber identity), C-RNTI (cell-radio network temporary identifier), IMEI (international mobile equipment identity)).

The handover purpose and related information may also include an indication to whether to transmit the handover purpose and related information to the target base station via the handover request. The indication to whether to transmit the handover purpose and related information to the target base station via the handover request is determined based on whether handover parameter optimization is necessary upon detecting a handover problem.

Then, the source eNB 203 may determine whether to transmit the handover purpose and related information (225). The source eNB 203 may determine whether to transmit the handover purpose and related information based on the details included in the handover purpose and related information. For example, in the case of an inter-RAT handover, although the handover purpose and related information are transmitted to the target base station, it is highly probable that the target base station cannot operate according to the present invention because of a low possibility of modifying the existing system operation. In this case, even if a handover problem is detected, it is not possible to determine which handover parameter should be optimized, so that the handover purpose and related information may be not transmitted.

Thereafter, the source eNB 203 may transmit a handover request message to the target eNB 205 (230). Here, if it is determined at operation 225 that the transmission is necessary, the handover purpose and related information may be included in the handover request message. To transmit the handover purpose and related information, the source eNB 203 may use the Mobility Information IE or a new IE in the Source To Target Transparent Container IE of the handover request message. When transmitting the handover information via the Mobility Information IE, a bit string (size 32) separated by certain bits can be used.

When handover purpose and related information are included in the received handover request message, the target eNB 205 may store the handover purpose and related information (240). The target eNB 205 may store the handover purpose and related information as the UE context of the terminal corresponding to the handover request message. Thereafter, when a handover report event is detected in relation to the source base station of the previous handover (250), the target eNB 205 may transmit a handover report including the stored handover purpose and related information to the source eNB 203 (260).

When a handover report event occurs, the target eNB 205 may identify the UE context of the corresponding terminal. If the handover purpose and related information transmitted by the source base station are stored, the target eNB 205 may transmit a handover report including the stored handover purpose and related information. This handover report is illustrated in FIG. 4A. In FIG. 4A, the handover purpose and related information may be carried by Mobility information IE 410 or Handover purpose and related information IE 420 (newly defined IE) among the IEs 400 of the handover report.

Figure 3:
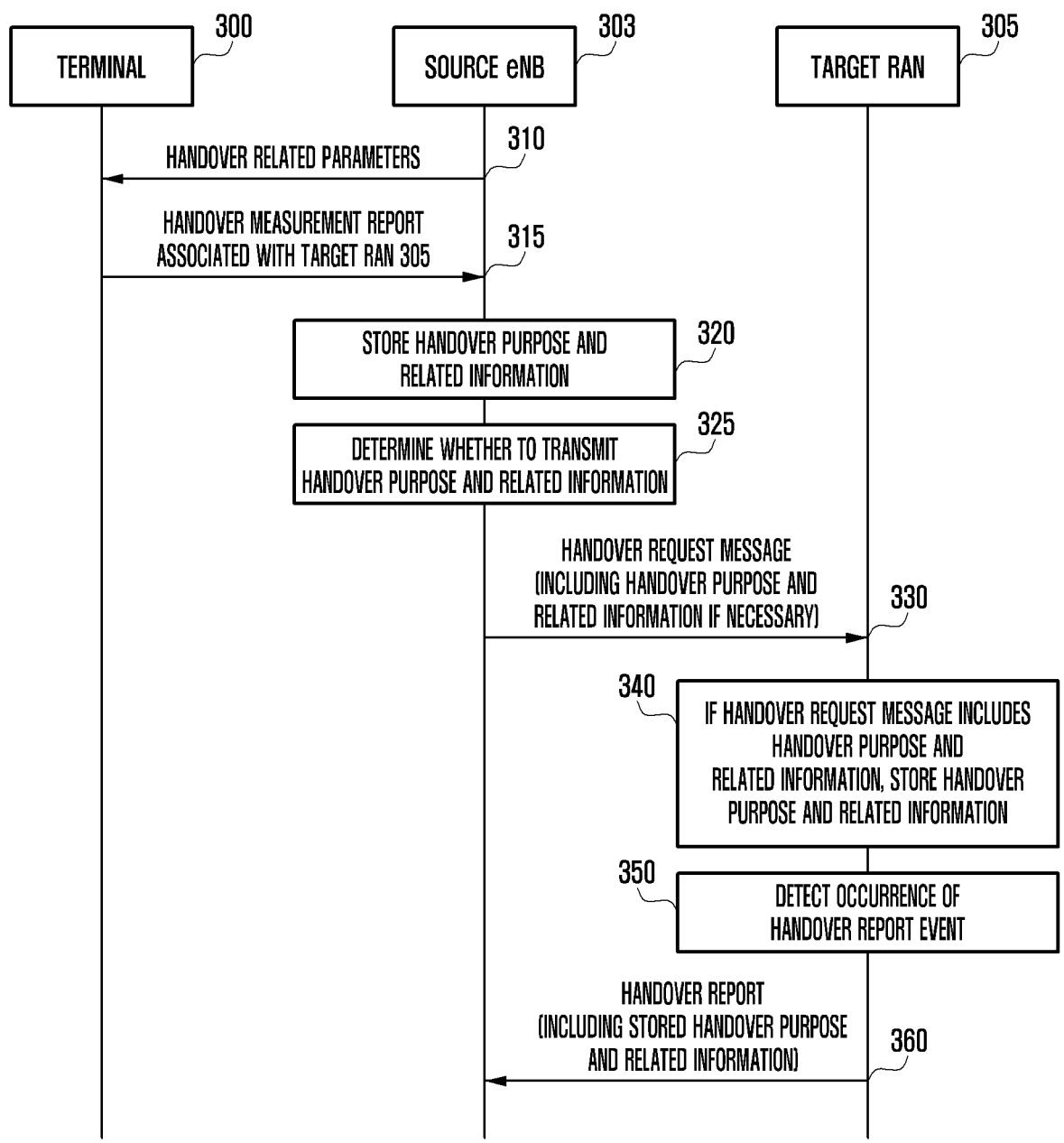
FIG. 3 depicts a procedure where, in the case of a heterogeneous network where the source base station is an eNB and the target base station is not an eNB, the source base station stores and transmits handover purpose and related information for optimization of handover parameters and receives a handover report according to an embodiment of the present invention.

FIG. 3 depicts a procedure where, in the case of a heterogeneous network where the source base station is an eNB and the target base station is not an eNB, the source base station stores and transmits handover purpose and related information for optimization of handover parameters and receives a handover report according to an embodiment of the present invention.

The scheme of FIG. 3 is the same as that of FIG. 2, but the source eNB 303 transmits handover related parameters to the terminal 300 (310), and the terminal 300 transmits a handover measurement report 310 about the target RAN 305 being a UTRAN RNC or GERAN BSC. Operations 320 to 360 correspond to operations 220 to 260.

Here, when the source eNB 303 transmits a handover request message to the target RAN 305 of the heterogeneous network at operation 330, to include the handover purpose and related information, the source eNB 303 may define a new IE in the Source To Target Transparent Container IE of the handover request message.

When the target RAN 305 transmits the source eNB 303 a handover report including the stored handover purpose and related information at operation 360, the target RAN 305 may define and use a new IE 440 for the handover purpose and related information among the IEs 430 of the handover report as shown in FIG. 4B.

FIG. 5 depicts a procedure where, upon detecting a handover problem, the source base station optimizes the handover parameters based on the handover purpose according to an embodiment of the present invention.

The source eNB 503 may detect a handover problem in the following cases (530). The first case is when a RRC connection re-establishment or connection request message is received from the terminal (510), or when, although not shown in FIG. 5, an RLF indication is received from the terminal after completion of RRC connection reestablishment or establishment.

The second case is when an RLF indication is received from a neighboring eNB (515), or when a handover report is received from a neighboring eNB (520). The neighboring eNBs may include the handover target eNB 505. In the present invention, the handover report may include the handover purpose and related information having been transmitted via the handover request.

The third case is when a handover report is received from a neighboring RAN (UTRAN or GERAN) of the heterogeneous network (525). In the present invention, the handover report may include the handover purpose and related information having been transmitted via the handover request.

If the source eNB 503 detects a handover problem in a manner described above (530), the source eNB 503 can identify the handover purpose and related information (535). The source eNB 503 may identify the handover purpose and related information stored in the UE context of the terminal or included in the received handover report.

Based on the handover purpose and related information, the source eNB 503 may determine whether to optimize the handover parameters according to the handover purpose having caused the handover problem (540). Upon determining to optimize the handover parameters at operation 540, the source eNB 503 may collect information about the handover problem and optimize the handover parameters based on the information accumulated for a specific period of time (545).

FIG. 6 is a flowchart illustrating a procedure where the source base station transmits a handover request message to the target base station according to an embodiment of the present invention.

In FIG. 6, the operation of the source eNB 203 or 303 shown in FIG. 2 or 3 is described in detail. The source base station may transmit the terminal handover related parameters according to the handover purpose (600). If the handover initiation condition is satisfied based on the handover related parameters, the source base station may receive a handover measurement report from the terminal (610). The source base station may store the handover purpose and related information as part of the UE context of the terminal (615). The source base station may determine whether to transmit the handover purpose and related information (620).

Upon determining not to transmit the handover purpose and related information, the source base station may transmit a regular handover request message to the target base station (630). Upon determining to transmit the handover purpose and related information as described in connection with FIG. 2, the source base station may include the handover purpose and related information in a handover request message (625) and transmit the handover request message to the target base station (630). Here, if the target base station is an LTE eNB, the handover purpose and related information may be carried by the Mobility Information IE of the Source To Target Transparent Container IE in the handover request message, or by a newly defined IE of the handover request message. If the target base station is a UTRAN RNC or GERAN BSC (heterogeneous network), the handover purpose and related information may be carried by a newly defined IE of the handover request message. However, it is an embodiment of the present invention that the source base station transmits the handover purpose and related information to the target base station through a handover request message, but the present invention is not limited thereto.

Thereafter, the source base station may wait to receive a response message for the handover request from the target base station (640). The response message may include a handover request confirmation message. Upon receiving the response message, the source base station may determine whether handover preparation is successful (645). If handover preparation is successful, the source base station may transmit a handover command to the terminal and wait for a resource release request (650). Thereafter, the source base station may terminate the hand-out procedure and delete the stored handover purpose and related information (655). If a response message is not received from the target base station within a preset time at operation 645, the source base station may determine that handover preparation is not successful, and terminate the hand-out procedure and delete the stored handover purpose and related information (655).

Figure 7:
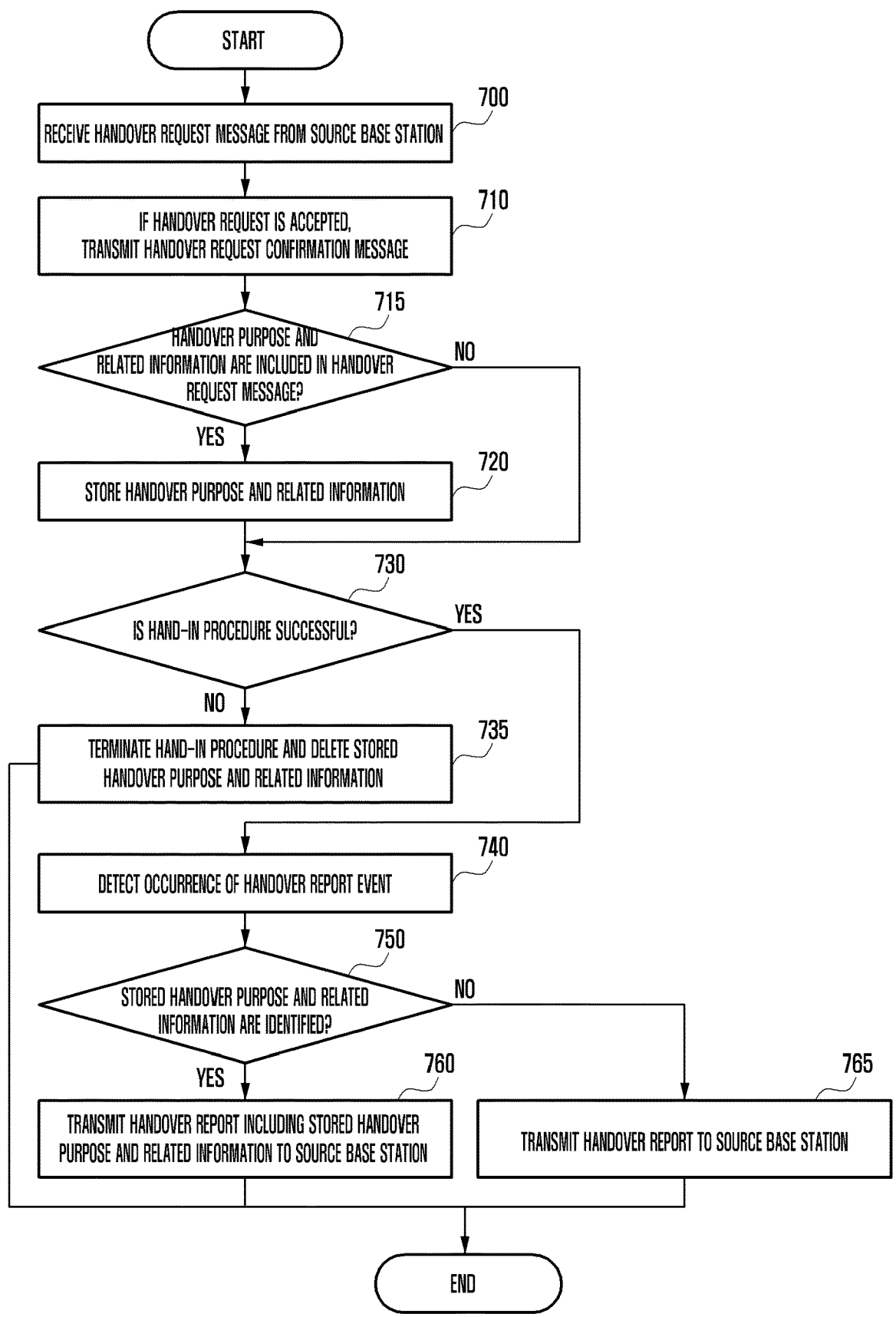
FIG. 7 is a flowchart illustrating a procedure where the target base station receives a handover request message from the source base station and transmits a handover report according to an embodiment of the present invention.

FIG. 7 is a flowchart illustrating a procedure where the target base station receives a handover request message from the source base station and transmits a handover report according to an embodiment of the present invention.

In FIG. 7, the operation of the target base station is described in more detail where the target base station may be an eNB 205 of the LTE system shown in FIG. 2 or a RAN 305 of a heterogeneous network (UTRAN RNC or GERAN BSC) shown in FIG. 3.

The target base station may receive a handover request message from the source base station (700). If the handover request is accepted, the target base station may transmit a handover request confirmation message (710). The target base station may determine whether handover purpose and related information are included in the handover request message (715). If handover purpose and related information are included in the handover request message, the target base station may store the handover purpose and related information as part of the UE context of the terminal (720), and may determine whether the hand-in procedure is successful (730). If the handover procedure is unsuccessful, the target base station may terminate the hand-in procedure and delete the stored handover purpose and related information (735).

Upon determining that the hand-in procedure is successful, the target base station may detect occurrence of a handover report event (740). The target base station may determine whether handover purpose and related information are stored in the UE context of the terminal (750). If the handover purpose and related information are stored, the target base station may transmit the source base station a handover report including the stored handover purpose and related information (760). Here, when the target base station is an LTE eNB, it may use Mobility Information IE or define a new IE to transmit the handover purpose and related information. When the target base station is a UTRAN RNC or GERAN BSC (heterogeneous network), it may define a new IE to transmit the handover purpose and related information.

If the handover purpose and related information are not stored at operation 750, the target base station may transmit a regular handover report to the source base station (765).

Figure 8:
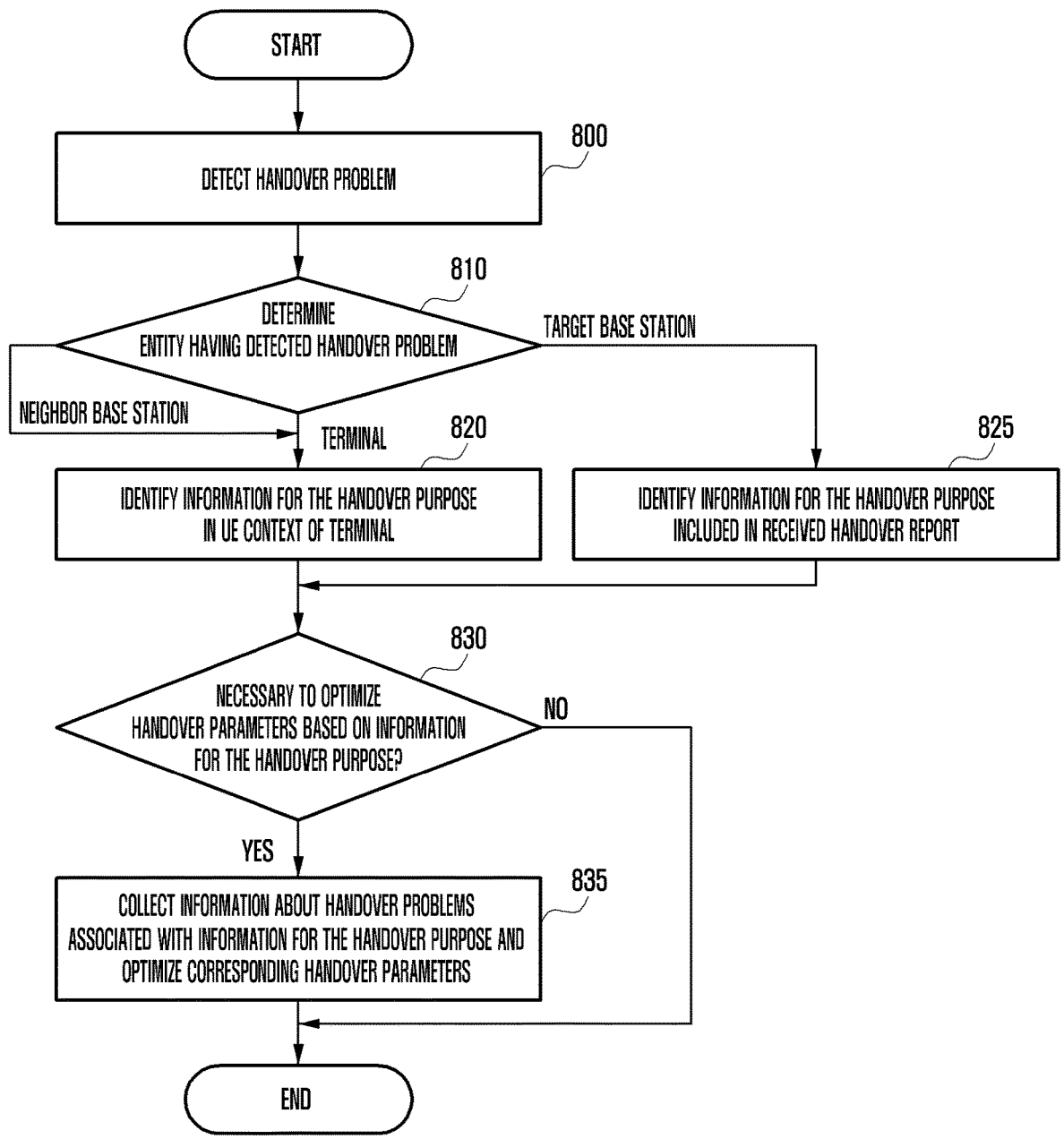
FIG. 8 is a flowchart illustrating a procedure where, upon detecting a handover problem, the source base station optimizes the handover parameters based on handover purpose information according to an embodiment of the present invention.

FIG. 8 is a flowchart illustrating a procedure where, upon detecting a handover problem, the source base station optimizes the handover parameters based on handover purpose information according to an embodiment of the present invention.

In FIG. 8, the operation of the source eNB 503 shown in FIG. 5 is described in more detail. The source base station may detect a handover (800). The source base station may determine the entity that has detected the handover problem (810). If the handover problem is detected through an RLF indication from a neighboring base station or through an RRC connection reestablishment message from the terminal, the source base station may identify the handover purpose information in the UE context of the terminal (820). If the handover problem is detected through the handover report from the target base station, the source base station may identify the handover purpose information included in the received handover report (825). At operation 820 or 825, the source base station may also identify the handover related information stored together with the handover purpose information.

Thereafter, the source base station may determine whether it is necessary to optimize the handover related parameters based on the handover purpose information (830). If it is necessary to optimize the handover related parameters based on the handover purpose information, the source base station may collect information about the handover problems associated with the handover purpose information and optimize the corresponding handover parameters (835).

Figure 9:
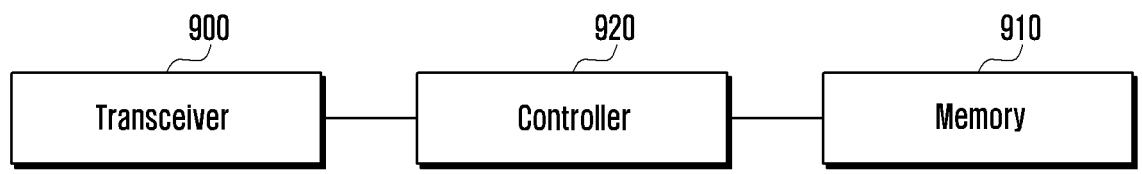
FIG. 9 is a block diagram of a source base station according to an embodiment of the present invention.

FIG. 9 is a block diagram of a source base station according to an embodiment of the present invention.

More specifically, the source base station may include a transceiver 900, a storage 910, and a controller 920.

The transceiver 900 can transmit and receive signals required for the source base station to perform operations according to the present invention. The transceiver 900 may transmit handover related parameters to the terminal. The transceiver 900 may receive a handover measurement report from the terminal. The transceiver 900 may transmit the target base station a handover request message, which can include handover purpose and related information if necessary. The transceiver 900 may receive a handover report from the target base station or receive an RLF indication from the terminal or a neighboring base station.

The storage 910 may store the information required for the source base station to perform operations according to the present invention. The storage 910 may store information received through the transceiver 900. The storage 910 may provide the stored information to the controller 920.

The controller 920 may control transmitting the handover parameters to the terminal based on the handover purpose, receiving a handover measurement report based on the handover parameters from the terminal, storing the handover purpose information, and transmitting a handover request message including the handover purpose information to the target base station.

The controller 920 may control receiving a radio link failure (RLF) indication, checking the stored handover purpose information, and adjusting the handover parameters based on the handover purpose information. The controller 920 may control receiving a handover report from the target base station, and adjusting, if the handover report includes handover purpose information, the parameters based on the handover purpose information.

The controller 920 may control storing handover related information based on the received handover measurement report. The handover request message may include the handover related information. The handover related information may include at least one of information on the handover initiation condition, information on the service being used by the terminal, and information on the terminal identification. The RLF indication may be received from at least one of the terminal and a neighboring base station.

Figure 10:
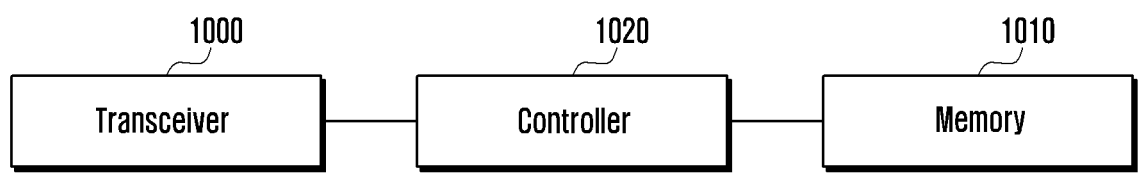
FIG. 10 is a block diagram of a target base station according to an embodiment of the present invention.

FIG. 10 is a block diagram of a target base station according to an embodiment of the present invention.

More specifically, the source base station may include a transceiver 1000, a storage 1010, and a controller 1020.

The transceiver 1000 can transmit and receive signals required for the target base station to perform operations according to the present invention. The transceiver 1000 may receive a handover request message, which can include handover purpose and related information if necessary, from the source base station. The transceiver 1000 may transmit a handover report to the source base station.

The storage 1010 may store the information required for the target base station to perform operations according to the present invention. The storage 1010 may store information received through the transceiver 1000. The storage 1010 may provide the stored information to the controller 1020.

The controller 1020 may control receiving a handover request message for the terminal from the source base station, and storing, if handover purpose information is included in the handover request message, the handover purpose information. The handover purpose information may be used by the source base station to configure handover parameters for the terminal.

The controller 1020 may control receiving a reconnection request from the terminal, and transmitting a handover report including the handover purpose information to the source base station. If handover purpose related information is included in the handover request message, the controller 1020 may control storing the handover purpose related information. The handover related information may include at least one of information on the handover initiation condition, information on the service being used by the terminal, and information on the terminal identification.

In the embodiments described above, each of all the steps and messages may be subject to selective execution or may be subject to omissions. The steps in each embodiment need not necessarily be executed in the listed order, but may be executed in a different order. The messages need not necessarily be delivered in the listed order, but may be delivered in a different order. Each step and message can be performed or delivered independently.

In the above-described embodiments, some or all of the illustrated tables are for illustration and understanding of a specific embodiment of the present invention. The details of the table can be regarded as representing a part of the method and apparatus proposed in the present invention. Therefore, it may be desirable that the contents of the tables herein be understood semantically rather than syntactically.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method by a base station for supporting a handover in a wireless communication system, the method comprising:
    transmitting, to a terminal, a message configuring at least one handover parameter for each of a plurality of handover purposes;
    receiving, from the terminal, a measurement report including first information on a measured result of handover parameters for a service based handover purpose among the plurality of handover purposes, and second information on service types used by the terminal;
    storing the first information and the second information in a context of the terminal;
    transmitting, to a target base station, a handover request message for the terminal;
    determining a service type associated with a handover failure of the terminal from the service types, based on the first information and the second information, in case that the handover failure of the terminal is detected; and
    adjusting at least one handover parameter associated with the determined service type.

2. The method of claim 1, further comprising:
    detecting the handover failure of the terminal based on a radio link failure (RLF) indication being received from the terminal or another base station, or a handover report being received from the target base station.

3. The method of claim 2, wherein the handover request message includes the first information and the second information.

4. The method of claim 3, wherein the information for the specific handover purpose is included in the handover request message, based on an indication included in the measurement report, wherein the indication indicates whether the first information and the second information are required to be transferred to the target base station.

5. The method of claim 1, further comprising:
    storing handover related information based on the received measurement report,
    wherein the handover related information includes at least one of information for a handover initiation condition, and information for a terminal identification.

6. A method by a base station for supporting handover in a wireless communication system, the method comprising:
    receiving, from a source base station, a handover request message for a terminal;
    storing, if first information on a measured result of handover parameters for a service based handover purpose and among a plurality of handover purposes, and second information on service types used by the terminal are included in the handover request message, the first information and the second information; and
    transmitting, to the source base station, a handover report including the first information and the second information, based on a handover failure of the terminal,
    wherein the handover failure is detected based on the handover report,
    wherein a service type associated with the handover failure of the terminal is determined from the service types based on the first information and the second base station, and
    wherein at least one handover parameter associated with the determined service type is adjusted in the source base station.

7. The method of claim 6, further comprising:
    receiving, from the terminal, a reconnection request,
    wherein the handover report is transmitted to the source base station based on the reconnection request.

8. The method of claim 6, further comprising:
    storing, if handover related information is included in the handover request message, the handover related information,
    wherein the handover related information includes at least one of information for a handover initiation condition, and information for a terminal identification.

9. A base station for supporting handover in a wireless communication system, comprising:
    a transceiver configured to transmit and receive signals; and
    a controller configured to:
        control the transceiver to transmit, to a terminal, a message configuring at least one handover parameter for each of a plurality of handover purposes;
        control the transceiver to receive, from the terminal, a measurement report including first information on a measured result of handover parameters for a service based handover purpose among the plurality of handover purposes, and second information on service types used by the terminal;
        store the first information and the second information in a context of the terminal;
        control the transceiver to transmit, to a target base station, a handover request message for the terminal;
        determine service type associated with a handover failure of the terminal from the service types, based on the first information and the second information, in case that the handover failure of the terminal is detected; and adjust at least one handover parameter associated with the determined service type.

10. The base station of claim 9, wherein the controller is configured to detect the handover failure of the terminal based on a radio link failure (RLF) indication being received from the terminal or another base station, or a handover report being received from the target base station.

11. The base station of claim 10, wherein the handover request message includes the first information and the second information.

12. The base station of claim 11, wherein the information for the specific handover purpose is included in the handover request message, based on an indication included in the measurement report, wherein the indication indicates whether the first information and the second information are required to be transferred to the target base station.

13. The base station of claim 9, wherein the controller is configured to store handover related information based on the received handover measurement report, wherein the handover related information includes at least one of information for a handover initiation condition, and information for a terminal identification.

14. A base station for supporting handover in a wireless communication system, comprising:

a transceiver configured to transmit and receive signals; and a controller configured to:

control the transceiver to receive, from a source base station, a handover request message for a terminal;

store, if first information on a measured result of handover parameters for a service based handover purpose and among a plurality of handover purposes, and second information on service types used by the terminal are included in the handover request message, the first information and the second information; and control the transceiver to transmit, to the source base station, a handover report including the first information and the second information, based on a handover failure of the terminal, wherein, when a reconnection request is received by the transceiver from the terminal, the controller is configured to control the transceiver to transmit, to the source base station, a handover report including the information for the specific handover purpose, wherein the handover failure is detected based on the handover report, wherein a service type associated with the handover failure of the terminal is determined from the service types based on the first information and the second base station, and wherein at least one handover parameter associated with the determined service type is adjusted in the source base station.

15. The base station of claim 14, wherein, if handover related information is included in the handover request message, the controller is configured to store the handover related information, and wherein the handover related information includes at least one of information for a handover initiation condition, and information for a terminal identification.

* * * * *